United States Patent
Shu et al.

(10) Patent No.: US 8,515,734 B2
(45) Date of Patent: Aug. 20, 2013

(54) INTEGRATED LANGUAGE MODEL, RELATED SYSTEMS AND METHODS

(75) Inventors: Chang-Qing Shu, Orlando, FL (US); Han Shu, Brookline, MA (US); John M. Mervin, Orlando, FL (US)

(73) Assignee: Adacel Systems, Inc., Orlando, FL (US)

( * ) Notice: Subject to any disclaimer, the term of this patent is extended or adjusted under 35 U.S.C. 154(b) by 614 days.

(21) Appl. No.: 12/701,788

(22) Filed: Feb. 8, 2010

(65) Prior Publication Data

US 2011/0196668 A1 Aug. 11, 2011

(51) Int. Cl.
*G06F 17/27* (2006.01)
*G10L 15/00* (2006.01)

(52) U.S. Cl.
USPC ...... 704/9; 704/1; 704/10; 704/231; 704/255; 704/257; 704/275

(58) Field of Classification Search
USPC .................. 704/1, 9, 10, 257, 275, 231, 255
See application file for complete search history.

(56) References Cited

U.S. PATENT DOCUMENTS

| | | | | |
|---|---|---|---|---|
| 5,497,502 A * | 3/1996 | Castille | ........................ | 455/3.05 |
| 5,521,816 A * | 5/1996 | Roche et al. | ........................ | 704/9 |
| 5,535,121 A * | 7/1996 | Roche et al. | ........................ | 704/9 |
| 5,537,317 A * | 7/1996 | Schabes et al. | ........................ | 704/9 |
| 5,621,859 A * | 4/1997 | Schwartz et al. | ........................ | 704/256 |
| 5,625,749 A * | 4/1997 | Goldenthal et al. | ........................ | 704/254 |
| 5,696,877 A * | 12/1997 | Iso | ........................ | 704/241 |
| 5,699,456 A * | 12/1997 | Brown et al. | ........................ | 382/226 |
| 5,712,957 A * | 1/1998 | Waibel et al. | ........................ | 704/240 |
| 5,719,997 A * | 2/1998 | Brown et al. | ........................ | 704/257 |
| 5,737,488 A * | 4/1998 | Iso | ........................ | 704/256 |
| 5,799,269 A * | 8/1998 | Schabes et al. | ........................ | 704/9 |
| 5,907,634 A * | 5/1999 | Brown et al. | ........................ | 382/226 |
| 5,995,918 A * | 11/1999 | Kendall et al. | ........................ | 704/1 |
| 6,154,722 A * | 11/2000 | Bellegarda | ........................ | 704/257 |
| 6,173,261 B1 * | 1/2001 | Arai et al. | ........................ | 704/257 |
| 6,832,190 B1 * | 12/2004 | Junkawitsch et al. | ........................ | 704/255 |
| 6,985,852 B2 * | 1/2006 | Wang | ........................ | 704/9 |
| 7,027,975 B1 * | 4/2006 | Pazandak et al. | ........................ | 704/9 |
| 7,031,908 B1 * | 4/2006 | Huang et al. | ........................ | 704/9 |
| 7,257,529 B2 * | 8/2007 | Bennett | ........................ | 704/9 |
| 7,286,978 B2 * | 10/2007 | Huang et al. | ........................ | 704/9 |
| 7,401,024 B2 * | 7/2008 | Haenel et al. | ........................ | 704/275 |
| 7,555,426 B2 * | 6/2009 | Wang | ........................ | 704/9 |
| 7,644,057 B2 * | 1/2010 | Nelken et al. | ........................ | 706/55 |
| 7,752,159 B2 * | 7/2010 | Nelken et al. | ........................ | 706/62 |
| 2003/0040901 A1 * | 2/2003 | Wang | ........................ | 704/4 |
| 2003/0050772 A1 * | 3/2003 | Bennett | ........................ | 704/9 |
| 2003/0191625 A1 * | 10/2003 | Gorin et al. | ........................ | 704/1 |
| 2005/0075884 A1 * | 4/2005 | Badt | ........................ | 704/275 |

(Continued)

*Primary Examiner* — Lamont Spooner
(74) *Attorney, Agent, or Firm* — Allen, Dyer, Doppelt, Milbrath & Gilchrist, P.A.

(57) ABSTRACT

An integrated language model includes an upper-level language model component and a lower-level language model component, with the upper-level language model component including a non-terminal and the lower-level language model component being applied to the non-terminal. The upper-level and lower-level language model components can be of the same or different language model formats, including finite state grammar (FSG) and statistical language model (SLM) formats. Systems and methods for making integrated language models allow designation of language model formats for the upper-level and lower-level components and identification of non-terminals. Automatic non-terminal replacement and retention criteria can be used to facilitate the generation of one or both language model components, which can include the modification of existing language models.

19 Claims, 3 Drawing Sheets

(56) References Cited

U.S. PATENT DOCUMENTS

| | | |
|---|---|---|
| 2005/0119878 A1* | 6/2005 | Haenel et al. ............... 704/202 |
| 2005/0203728 A1* | 9/2005 | Wang ............................. 704/4 |
| 2006/0184354 A1* | 8/2006 | Huang et al. ................... 704/6 |
| 2006/0190252 A1* | 8/2006 | Starkie ......................... 704/240 |
| 2006/0241946 A1* | 10/2006 | Oerder ....................... 704/270.1 |
| 2011/0004462 A1* | 1/2011 | Houghton et al. ............... 704/9 |

* cited by examiner

INTEGRATED LANGUAGE MODEL, RELATED SYSTEMS AND METHODS

FIELD OF THE INVENTION

The present invention relates to automatic speech recognition, and more particularly to systems and methods for making language models for speech recognition engines.

BACKGROUND OF THE INVENTION

Referring to FIG. 3, in a typical speech recognition engine 1000, a signal 1002 corresponding to speech 1004 is fed into a front end module 1006. The front end 1006 module extracts feature data 1008 from the signal 1002. The feature data 1008 is input to a decoder 1010, which the decoder 1010 outputs as recognized speech 1012. An application 1014 could, for example, take the recognized speech 1012 as an input to display to a user, or as a command that results in the performance of predetermined actions.

To facilitate speech recognition, an acoustic model 1018 and a language model 1020 also supply inputs to the decoder 1010. The acoustic model 1018 utilizes the decoder 1010 to segment the input speech into a set of speech elements and identify to what speech elements the received feature data 1008 most closely correlates.

The language model 1020 assists the operation of the decoder 1010 by supplying information about what a user is likely to be saying. There are two major formats for language models: the finite state grammar (FSG) and the statistical language model (SLM).

The FSG format typically includes a plurality of predetermined text element sequences. "Text element" as used herein can refer to words, phrases or any other subdivision of text, although words are the most common text elements. To apply an FSG format language model, the decoder 1010 compares the feature data 1008 (also utilizing input from the acoustic model 1018) to each of the text element sequences, looking for a best fit.

Provided the user actually is speaking one of the predetermined sequences, the FSG format offers relatively high accuracy. However, if the user does not speak one of the sequences, a decoder applying the FSG format will not yield the correct result. Additionally, compiling a suitable list of sequences for a given application can be time and labor intensive. Moreover, to yield acceptable results for complex applications, an FSG format language model must be extremely large, resulting in higher memory and processing demands.

An SLM format language model, sometimes referred to as an "n-gram" format, is built from a textual corpus by identifying, for each text element (e.g., each word), the probability that the element will be found in proximity with the other text elements. Typically, probabilities are determined for each group of two (bi-gram) or three (tri-gram) text elements, although other quantities can be used. A nominal probability is usually also assigned to text elements groups that do not actually occur in the textual corpus.

The SLM format allows for the potential recognition of a larger range of user utterances with a relatively small language model. However, the accuracy of the SLM format typically compares unfavorably with the FSG format.

The concept has been advanced to combine features of both language model formats to mitigate the disadvantages and capitalize on the advantages of each. An example of efforts in this direction can be found in U.S. Pat. No. 7,286,978. However, there have been only limited practical attempts at such combinations, and further enhancements and improvements are possible.

SUMMARY OF THE INVENTION

In view of the foregoing, it is an object of the present invention to provide integrated language models, and related systems and methods for making and using the integrated language models.

According to an embodiment of the present invention, a system for making an integrated language model comprises at least one processor and machine-readable memory. The processor and memory are configured to execute a language model integration control module adapted to receive user inputs regarding language model integration options and to generate language model modification rules and application rules based thereon, and a language model generation module adapted to generate new and/or modify existing language models based upon the language model generation rules to generate upper-level and lower-level language model components for the integrated language model.

According to a method aspect of the present invention, a method of making an integrated language model for a speech recognition engine includes identifying a first language model format for an upper-level language model component, identifying a plurality of text elements to be represented by a non-terminal in the upper-level language model component and generating the upper-level language model component including the non-terminal. "Non-terminal," as used herein, generally indicates a term or other marker determined as a result of decoder operation that does not represent an actual text element in a hypothesis, but rather is an intermediate marker that indicates further operations must be applied thereto to determine the corresponding text element or elements. The method of making an integrated language model further includes identifying a second language model format for a lower-level language model component to be applied to the non-terminal of the upper-level language model component and generating the lower-level language model component.

According to another method aspect of the present invention, a method for identifying text elements to be represented by non-terminals in an integrated language model for a speech recognition engine includes determining a text element replacement criterion allowing automatic identification of the text elements to be represented by the non-terminals within an existing language model or textual corpus, and applying the text element replacement criterion to the existing language model or textual corpus.

These and other objects, aspects and advantages of the present invention will be better understood in view of the drawings and following detailed description of preferred embodiments.

DETAILED DESCRIPTION OF PREFERRED EMBODIMENTS

Figure 1:
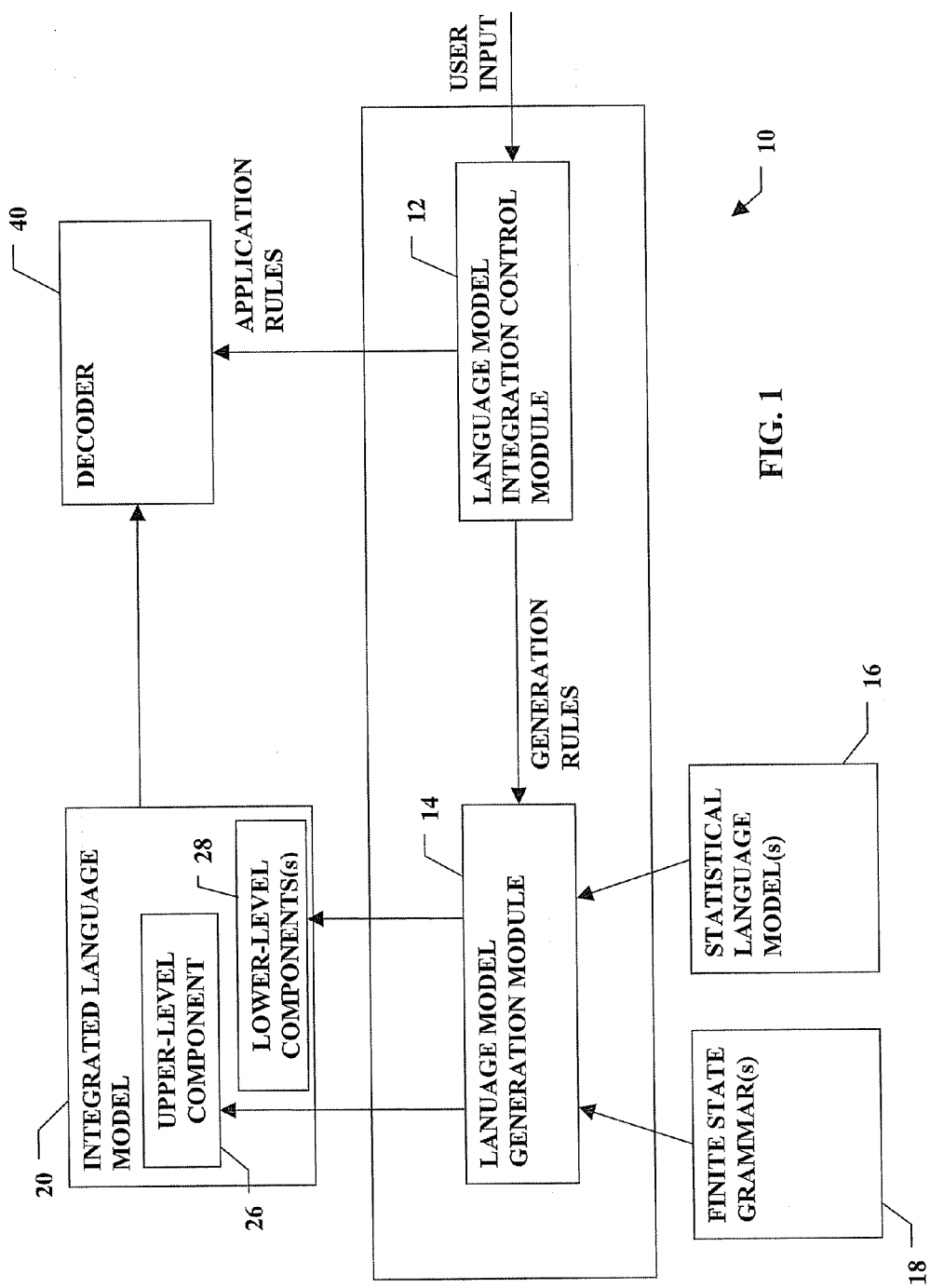
FIG. 1 is a schematic overview of a system for making an integrated language model, according to an embodiment of the present invention.

Referring to FIG. 1, according to an embodiment of the present invention, a system 10 for making an integrated language model includes a language model integration control module 12 and a language model generation module 14. Existing statistical language model (SLM) format language models 16 and finite state grammar (FSG) format language models 18 are accessible by the language model generation module 14. An integrated language model 20, including an upper-level language model component 26 having one or more non-terminals, and one or more lower-level language model components 28 for application to the non-terminal(s), is output by the language model generation module 14 and available as an input to the decoder 40 of a speech recognition engine.

It will be appreciated that speech recognition engines are inherently machine processor-based. Accordingly, the systems and methods herein are realized by at least one processor executing machine-readable code and that inputs to and outputs from the system or method are stored, at least temporarily, in some form of machine-readable memory. However, the present invention is not necessarily limited to particular processor types, numbers or designs, to particular code formats or languages, or to particular hardware or software memory media.

The language model integration control module 12 is adapted to receive user inputs regarding language model integration options; for instance, which language model format to be applied globally as the upper-level language model component 26, which language model format(s) to be applied to non-terminals as the one or more lower-level language model components 28, and how the upper-level and lower-level language model components are to be generated for application globally and to non-terminals. Based on the user inputs, the language model integration control module 12 determines generation rules for the language model generation module 14 and application rules for the decoder 40.

The language model generation module 14, based on the generation rules from the language model integration control module 12, makes new and/or modifies the existing SLM and/or FSG format language models 16, 18 to generate the upper-level and lower-level language model components 26, 28 that form the integrated language model 20.

The integrated language model 20 is applied by the decoder 40 based on the application rules supplied by the language model integration control module 12, such that the upper-level language model component 26 is applied globally and the one or more lower-level language model components 28 are applied to non-terminals.

It will be appreciated that systems for making an integrated language model falling within the scope of the present invention will not necessarily require the exact components described above. Additionally, it is not necessarily required that all of the various functional modules be executed by the same machine or within a particular time period. For instance, generation and application rules could be generated by a language model integration control module 12 on one computer and then stored and loaded onto a second computer with the language model generation module 14.

Also, it will be appreciated that the present invention can also include speech recognition engines and related systems that use integrated language models such as those produced by the system 10.

Figure 2:
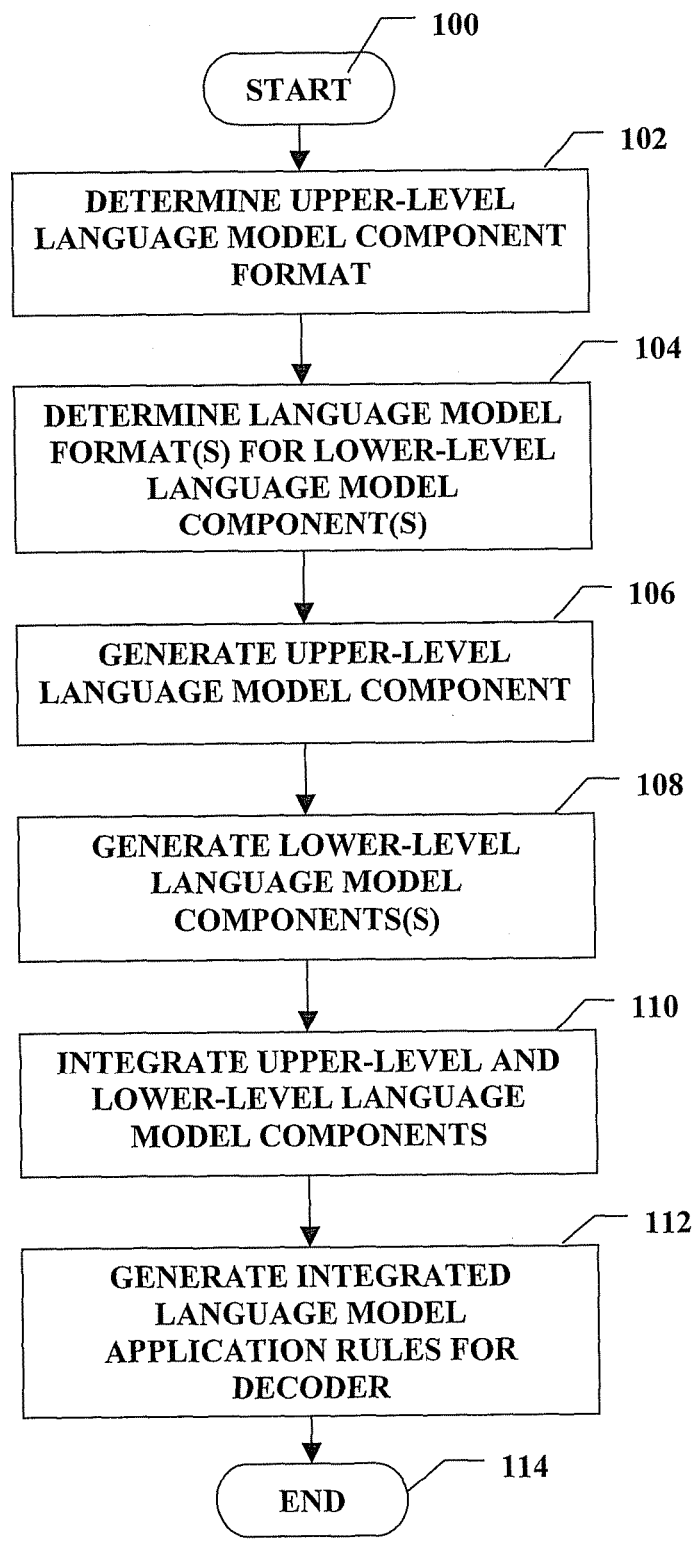
FIG. 2 is a flow diagram of a method for making an integrated language model, according to a method aspect of the present invention.
Figure 3:
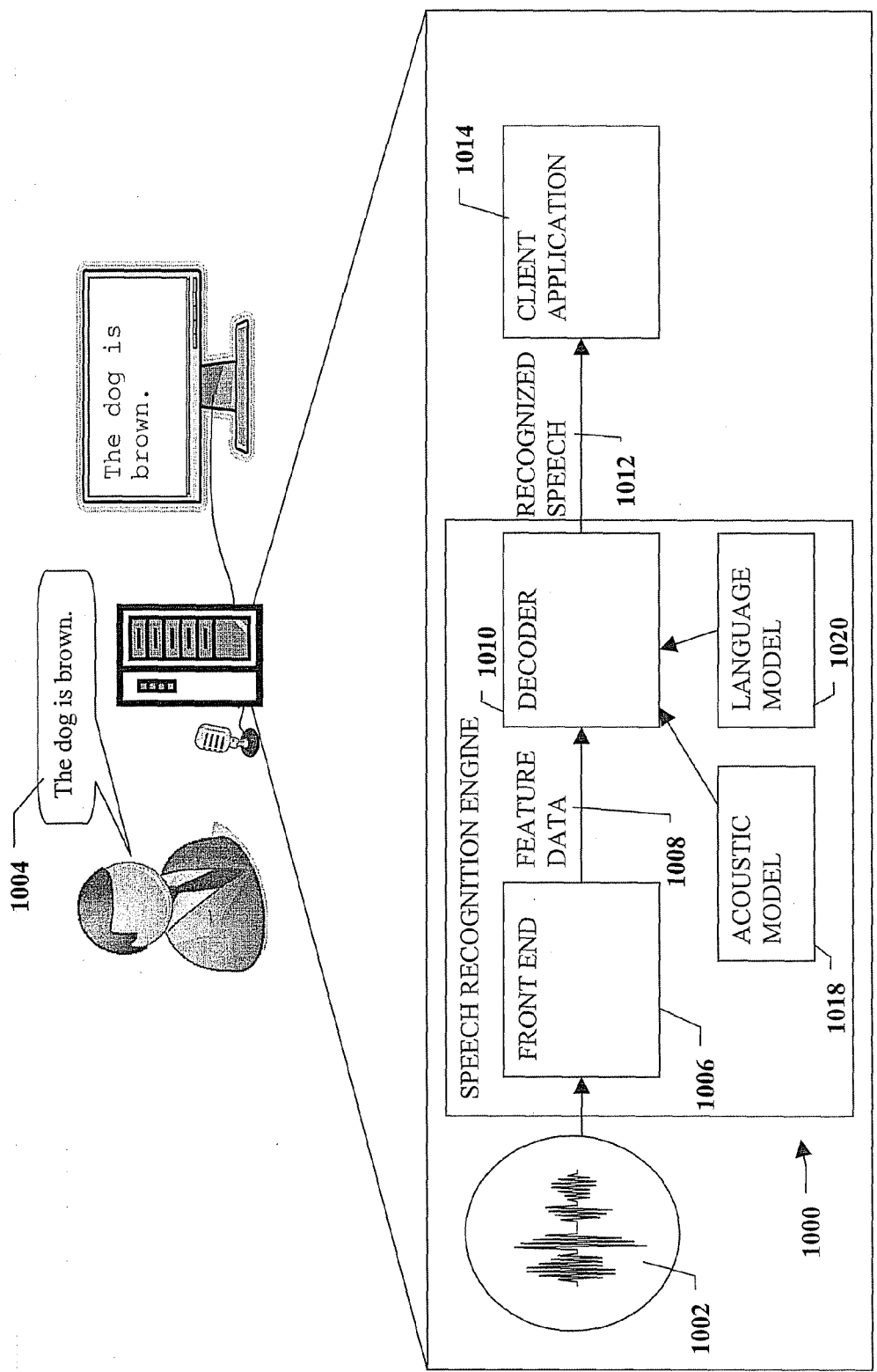
FIG. 3 is a schematic overview of a typical speech recognition engine.

Referring to FIG. 2, according to a method aspect of the present invention, a method for making an integrated language model begins at block 100. At blocks 102 and 104, determinations are made regarding language model formats to be used for the upper-level and lower-level language model components. The following table illustrates basic possible combinations of language model formats.

TABLE 1

| UPPER-LEVEL | LOWER-LEVEL (non-terminals) |
|---|---|
| FSG | FSG |
| FSG | SLM |
| SLM | SLM |
| SLM | FSG |

It will be appreciated that further combinations can fall within the scope of the present invention other than those above. For example, multiple language model components, of the same or different formats could be applied to non-terminals within the integrated language model. For instance, an FSG format lower-level language model component could be applied to one or more non-terminals and an SLM format lower-level language model component applied to other non-terminals.

Alternately, different FSG format lower-level language model components could be applied to different non-terminals. Also, multiple layers of lower-level language model components could be applied to non-terminals. For instance, the lower-level language model component applied to non-terminals of the upper-level language model component could have further non-terminals therein, to which another lower-level language model component is applied. The following table illustrates some more complex combinations that are possible, although many additional combinations are possible.

TABLE 2

| UPPER-LEVEL | LOWER-LEVEL 1 (non-terminals of Upper Level) | LOWER-LEVEL 2 (non-terminals of Lower Level 1) |
|---|---|---|
| FSG | FSG | SLM |
| FSG | SLM1 | FSG1 |
|  | SLM2 | FSG2 |
| SLM | FSG | FSG |
| SLM | FSG | — |
|  | SLM | SLM |

At block 106, an upper-level language model component, of the format determined at block 102, is generated for use in the integrated language model. This can include replacing text elements in an existing language model, or vocabulary thereof, with non-terminals. The language model is then compiled or re-complied, or otherwise re-structured as necessary, with the non-terminals instead of the text elements. This process will generally result in a reduction in size of the upper-level language model component, as well as a reduction in the overall size of the integrated language model.

For example, "n" different words are represented by a single non-terminal. When each instance of the "n" words is replaced by the non-terminal, it occurs "m" times within a grammar. Accounting for these words without the non-terminal would require a corresponding language model to account for (n×m) word instances, whereas accounting for these words with the non-terminal potentially requires only accounting for (n+m) word instances.

Various mechanisms can be employed to identify the text elements within the upper-level language model component that are to be replaced with non-terminals. Advantageously, text element replacement criteria can be specified that allow text elements to be automatically identified and replaced with non-terminals. For instance, text element sequences having a definable length can be automatically identified and replaced. For example, if domestic telephone numbers were to be replaced with a non-terminal, the following criteria could be used to identify telephone numbers within the language model vocabulary:

<telephone_number>=Loop{<zero>, <one>, . . . , <nine>; length==7 or length==10}.

Also, a definable text element sequence having a definable value range can be automatically identified and replaced. For example, if compass headings and angle measurements were to be replaced with a non-terminal, the following criteria could be used:

<direction_degree>=Loop{<zero>, <one>, . . . , <nine>; Value>=0 and Value<=360}.

Additionally, a user could provide a list of text elements to be associated with a given non-terminal rather than, or in addition to, automatic replacement criteria, and the system could search for and replace those text elements with the given non-terminal. Moreover, whether using automatic replacement criteria or a specific list, certain text elements might be replaced with non-terminals that should remain within the language model. Lists of such text elements can be provided by a user, or a set of automatic retention criteria can be applied to automatically identify such text elements. Also, the automatic replacement criteria can further include text element context information to help prevent undesired non-terminal replacements.

In general, the selection of the upper-level and lower-level language model component formats for the integrated language model, as well as the non-terminals to be employed, will be driven by the nature of the speech recognition application, with a goal of achieving an optimal combination of reduction in grammar size and processing time and increasing recognition accuracy for a given speech recognition application. Predictive modeling and/or experimentation can be used to help measure the achievement of this goal.

At block 108, lower-level language model components, of the format(s) determined at block 104, are made or modified for lower-level application to the non-terminals. As discussed above, multiple lower-level language model components can be used, and such lower-level language model components can, themselves, include non-terminals to which one or more additional lower-level language model components are applied.

The lower-level language model components to be applied to non-terminals can be purpose-built or generated by modifying existing language models. For instance, automatic criteria or list-based mechanisms, similar to those used to introduce non-terminals into the upper-level language model component, can be used in reverse to eliminate text elements that are non-applicable to a given non-terminal.

At block 110, the upper-level and lower-level language model components are combined in the integrated language model. This does not necessarily, and preferably does not, require a merger of the different language model components, as the upper-level and lower-level language model components will generally be applied separately. The combination can include, however, the naming or otherwise identifying of the components as upper-level and lower-level, and further identifying the non-terminal(s) associated with each lower-level language model component, so that the decoder can properly access the language model components during operation of the speech recognition engine.

At block 112, application rules for the decoder are generated to support the use of the integrated language model. For example, where the decoder supports selective use of either FSG or SLM format language models as alternate options, the decoder should be modified to allow application of both FSG and SLM format language models, including language models of either format having non-terminals which direct the decoder to language models of either format corresponding to the non-terminals. When using an integrated language model according to the present invention, the decoder should be configured to treat non-terminals as text elements during searching, back tracing and the like, with the upper-level language model component being applied outside of the non-terminals and the lower-level language model component applied within.

At block 114, the method ends, although the method can repeated as necessary to create or modify further integrated language models. Additionally, it will be appreciated that all the method steps enumerated above are not necessary for every execution of the method for making an integrated language model. Also, the steps are not necessarily limited to the sequence described, and many steps can be performed in other orders, in parallel, or iteratively. Furthermore, the present invention also encompasses methods of speech recognition engine use including the application of language models like those generated by the method for making an integrated language model.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A method of making an integrated language model for a speech recognition engine, the method comprising:
   using at least one processor and machine readable memory:
   identifying a first language model format for an upper-level language model component;
   identifying a plurality of text elements to be represented by a non-terminal in the upper-level language model component;
   generating the upper-level language model component including the non-terminal;
   identifying a second language model format for a lower-level language model component to be applied to the non-terminal of the upper-level language model component; and
   generating the lower-level language model component;
   wherein generating the upper-level language model component includes modifying an existing language model; and
   wherein identifying the plurality of text elements to be represented by the non-terminal in the upper-level language model component includes applying an automatic text element replacement criterion to the existing language model.

2. The method of claim 1, wherein the first language model format is a finite state grammar format.

3. The method of claim 2, wherein the second language model format is a statistical language model format.

4. The method of claim 1, wherein a plurality of non-terminals are included in the upper-level language model.

5. The method of claim 4, wherein a plurality of lower-level language model components are applied to the plurality of non-terminals.

6. The method of claim 5, wherein the plurality of lower-level language model components include at least two language model components having different language model formats.

7. The method of claim 5, further comprising identifying to which of the plurality of non-terminals each of the plurality of lower-level language models is to be applied during operation of the speech recognition engine.

8. The method of claim 1, wherein the lower-level language model component also includes a non-terminal, and the method further comprises identifying a third language model format for an additional lower-level language model component to be applied to the non-terminal of the lower-level language model component, and generating the additional language model component.

9. The method of claim 1, wherein the existing language model is a finite state grammar format language model.

10. The method of claim 1, wherein the existing language model is a statistical language model format language model.

11. The method of claim 1, wherein the text element replacement criterion is to replace text element sequences having a definable length.

12. The method of claim 11, wherein the definable length is a number of digits.

13. The method of claim 1, wherein the text element replacement criterion is to replace text element sequences having a definable value range.

14. The method of claim 1, wherein a plurality of automatic text element replacement criteria are applied.

15. The method of claim 1, wherein identifying the plurality of text elements to be represented by the non-terminal in the upper-level language model component further includes applying an automatic text element retention criterion to the existing language model.

16. The method of claim 1, wherein generating the lower-level language model component includes modifying an existing language model.

17. The method of claim 16, wherein modifying the existing language model includes automatically eliminating text elements that are determined not to be relevant to the non-terminal, the determination being based on a non-terminal replacement criterion applied to identify the plurality of text elements to be represented by the non-terminal.

18. The method of claim 1, further comprising generating instructions for a speech recognition engine decoder to apply the upper-level and lower-level language model components during operation.

19. The method of claim 1, wherein the text elements are words.

* * * * *